Patented Nov. 25, 1947

2,431,562

UNITED STATES PATENT OFFICE 2,431,562

PROCESS FOR IMPROVING THE FASTNESS OF DYED MATERIAL

Raymond W. Jacoby, Providence, R. I., assignor to Ciba Products Corporation, Hoboken, N. J., a corporation of Delaware No Drawing. Application May 6, 1944, Serial No. 534,519

4 Claims. (Cl. 117—161)

The present invention relates to a substantive type of aminotriazine-aldehyde resin, particularly melamine-formaldehyde resin, and to a method for the treatment of fibrous materials therewith.

Aminotriazine-aldehyde resins, and particularly melamine-formaldehyde resins, have been found to be of advantage in treating textile materials to improve the fastness of various types of dyestuffs with which the textile materials have been dyed, and also to stabilize the fabric, i. e. to prevent the latter from shrinking, ravelling, etc.

As these resins have no inherent affinity for the fibers, it has been necessary to apply them mechanically. The method which has been followed is, essentially, to make up a water solution, of the desired strength, of the resin in its water-soluble stage, adding a catalytic agent to assist in the polymerization. The goods are then immersed in this solution and dried. The resin content in the goods will depend upon the strength of the solution applied, and upon the amount of solution present in the goods before drying.

A manifest disadvantage of this state of the art is its uneconomical character, in that it involves considerable additional handling through further equipment as well as an intermediate drying before the resin is applied. This disadvantage would be obviated and a substantial contribution made to the state of the art by making the said resins "substantive," that is, so that the fabrics absorb them from a solution thereof, analogously to the absorption of a substantive dyestuff from a water solution of the dyestuff, so that the resin could be applied to the wet goods in the equipment in which it had received other processing.

A primary purpose of the invention is the realization of a simple and economical method for the treatment of fibrous materials with the aforedescribed substantive products.

The foregoing and other objects and advantages of the invention will be apparent from the following description thereof.

Briefly stated, the objects of the invention are realized, for example, by treating melamine-formaldehyde resin, in its water-soluble stage, with a strong mineral acid in the cold (i. e. at room temperature) and allowing the admixture to stand for a considerable period of time. A reaction takes place and the resin becomes substantive, that is, textile fibers will absorb or exhaust the same from the solution and the amount of resin present in the goods will be greater than would be indicated by figuring the strength or concentration of the resin solution and the amount of solution picked up by the goods. In other words, the resin goes onto the cloth by attraction rather than by mechanical application.

According to a presently-preferred embodiment of the invention, the procedure is as follows:

a. Preparation of solution 100 cc. of water are heated to 110° F. and 10 cc. of commercial grade concentrated hydrochloric acid (20° Baumé) are added.

22 gms. of melamine-formaldehyde resin (A) are added to the resultant solution with constant stirring. Stirring is continued until solution is complete. When a clear solution is obtained, it is further diluted with water to a volume of 200 cc. This solution is then allowed to stand for a considerable length of time (24 to 48 hours) during which time the resin undergoes a change. The precise character or nature of the reaction is not known but that a change actually takes place is evidenced by the fact that if the said solution is used as just prepared, it does not give the same results that it does after standing for a considerable period of time.

b. Treatment of the fibrous material

The resultant solution then contains 11% of melamine-formaldehyde resin. Good color fixation or fabric stabilization would be obtained by the addition to the fabric of 2% to 3% of melamine-formaldehyde resin, based on the weight of the fabric. According to the present invention, therefore, an amount of the above prepared solution is taken so as to give the required resin content based upon the weight of the goods being treated. Thus, for each 1000 gms. of fabric, to which for example 2.2% of resin, i. e. 22 gms., is to be added, use is made of 200 gms. of the solution. The requisite amount of the solution is added to the water in the dyebeck, jig or other equipment in which the goods may have been dyed or otherwise processed. The goods are then circulated in the resultant solution for from ½ hour to 1 hour. At the end of this time, the goods have absorbed or exhausted the resin from the solution and the color will be materially improved as to fastness properties and the fabric itself will be materially improved as to stabilization. Subsequent handling of the goods is the same as with any conventionally dyed fabric, i. e. surplus water is removed by centrifugal abstraction, vacuum abstraction, pressure, etc., and the goods are dried in the usual manner. The acid appears to act as a catalyst, during the drying, to complete polymerization.

c. Preparation of resin (A)

The water-soluble melamine-formaldehyde resin (A) may be prepared by dissolving 630 parts by weight of melamine in 1700 parts by volume of a neutral aqueous solution of formaldehyde of 32% strength by volume, while stirring in a boiling water bath. As soon as dissolution is complete, the solution is cooled and allowed to stand. After 1-2 days, the solution is converted into a solid whitish mass which is soluble in hot water to a clear solution which can be diluted with water in an unlimited degree. (Parts by volume have the same relation to parts by weight as the litre has to the kilo.)

While the melamine-formaldehyde condensation products have proved to be of particular interest, use may also be made of those aldehyde condensation products of other aminotriazines which are soluble in water and capable of being hardened, e. g. melam, 2-chloro-4,6-diamino-1,3,5-triazine, etc. Aldehydes which may be used include acetaldehyde, benzaldehyde, etc.

The invention is primarily applicable to textile materials such as cotton, mercerized cotton, ramie, jute, hemp, sisal, silk, artificial silk and wool, but is also applicable to other fibrous materials.

The preparation of the solution is preferably carried out with a relatively volatile inorganic acid such as hydrochloric acid in order to avoid tendering of the material. Other acids may, however, be employed.

Having thus described the invention, what is claimed is:

1. A process for improving the fastness of dyed textile material by the application thereto of aminotriazinealdehyde resin, which comprises immersing the said dyed material immediately after the dyeing thereof in an aqueous bath consisting of a solution of aminotriazinealdehyde resin in water-soluble stage, which solution has been subjected to the action of strong mineral acid for a period of time to convert the resin into substantive state, the said bath containing the amount of resin which it is desired to apply to the material, whereby the resin is exhausted from the solution and uniformly applied to the material, and subsequently drying the latter.

2. A process for improving the fastness of dyed textile material by the application thereto of melamine-aldehyde resin, which comprises immersing the said dyed material immediately after the dyeing thereof in an aqueous bath consisting of a solution of melamine-formaldehyde resin in water-soluble stage, which solution has been subjected to the action of strong mineral acid for a period of time to convert the resin into substantive state, the said bath containing the amount of resin which it is desired to apply to the material, whereby the resin is exhausted from the solution and uniformly applied to the material, and subsequently drying the latter.

3. A process for improving the fastness of dyed textile material by the application thereto of melamine-formaldehyde resin, which comprises immersing the said dyed material immediately after the dyeing thereof in an aqueous bath consisting of a solution of melamine-formaldehyde resin in water-soluble stage, which solution has been subjected to the action of hydrochloric acid for a period of 24-48 hours to convert the resin into substantive state, the said bath containing the amount of resin which it is desired to apply to the material, whereby the resin is exhausted from the solution and uniformly applied to the material, and subsequently drying the latter.

4. The process according to claim 1, wherein the bath is the bath wherein the dyeing of the material was effected, the said aminotriazine-resin solution being added immediately after the dyeing operation.

RAYMOND W. JACOBY.

REFERENCES CITED

The following references are of record in the file of this patent:

UNITED STATES PATENTS

| Number | Name | Date |
|---|---|---|
| 2,322,333 | Widmer | June 22, 1943 |
| 2,345,543 | Wohnsiedler | Mar. 28, 1944 |
| 2,356,719 | Wohnsiedler | Aug. 22, 1944 |
| 2,169,546 | Widmer | Aug. 15, 1939 |